Patented Jan. 8, 1952

2,581,407

UNITED STATES PATENT OFFICE 2,581,407

JOINT LUBRICANT AND SEALING COMPOSITION

George M. Hain, United States Navy

No Drawing. Application December 11, 1945,
Serial No. 634,344

7 Claims. (Cl. 252—29)

(Granted under the act of March 3, 1883, as
amended April 30, 1928; 370 O. G. 757)

This invention relates to lubricants and sealing compositions for joints, especially threaded joints.

An object of the present invention is to provide a sealing composition and joint lubricant which maintains its plasticity when in place for long periods.

Another object of this invention is to provide a material which may be used for sealing plugs and joints which are subjected to high pressures.

A further object of this invention is to provide a plug lubricant and sealant of such low vapor pressure that it may be used to seal plugs for the access openings to mechanisms which might be injured by the condensation upon said mechanisms of the vapors given off by a volatile sealing compound.

Other objects and advantages of the invention will in part be obvious and in part appear hereinafter.

Because of its properties the composition is especially valuable for use as a sealant for access doors to meters and gauges which are housed in underground systems which generally require that the instrument housing be watertight, and the scale of the instrument be easily observed by means of an access door. This invention provides a sealant of such composition that an access door may be removed and replaced several times without application of additional sealant material each time. Quite frequently the conduits for such instruments are connected with the housing by means of threaded pipe joints and the invention is applicable to the sealing of these threaded junctions.

The composition of the invention comprises a linear hydrocarbon polymer of high viscosity and low volatility which is stable with respect to its plasticity over a long period of time. In this base is dispersed through the use of a suitable dispersing agent, a solid material, sometimes called a solid lubricant, such as flake graphite, mica, or talc. Such solid materials in finely divided form possess a friction-reducing effect when applied between two surfaces either in solid state or when dispersed in a fluid medium.

Known materials used as joint sealants have several disadvantages, in that the joints sealed therewith are not readily dissembled and reassembled because of setting of the sealant or corrosion of the joint. In addition, most sealants are not effective against high pressures or extreme hydrostatic shocks.

The invention described herein overcomes the disadvantages of prior sealant compositions in that it develops optimum sealing properties by combining a low volatility, high viscosity fluid which does not undergo chemical change upon standing for long periods, together with a dispersed solid lubricant which is unaffected by ageing or wear.

Of the various media which may be used as a base for a composition of this nature, the most satisfactory types have been found to be linear hydrocarbon polymers. Butene, for example, is capable of polymerization to a polybutene which polymerization may be controlled to produce approximately the desired molecular weight. As the polybutene chain is lengthened the compounds become increasingly viscous and their vapor pressures correspondingly lower. A practical limit for the viscosity is reached when the medium becomes too stiff to act as a sealant. In accordance with this rule the usable range of molecular weights for polybutene polymers varies from about 3,000 to 10,000. All of these materials are substantially unaffected with respect to their viscosity by ageing and are not dried or oxidized by exposure to air, water, or moderately elevated temperatures.

In the selection of the solid lubricant the dispersed material to be used must satisfy certain requirements. It should be insoluble in the hydrocarbon base but should be dispersible therein. It should also possess a lubricating but not an abrasive action between the surfaces to which it is to be applied. A variety of substances satisfy these requirements among which are graphite, mica, talc, calcium carbonate, and soapstone, all of which are capable of reducing friction between metallic surfaces.

The dispersing agent must be compatible with the hydrocarbon base. Lecithin and such compounds as di-octyl sodium sulfo succinate and the metal salts of aryl stearic acids may be used.

The proportion of components will necessarily vary depending upon the specific applications of the joint sealant. Amounts of solid lubricant of from 10 per cent to 50 per cent by weight may be added to the hydrocarbon base. Quantities of dispersing agent ranging from about 0.5 per cent to 5 per cent by weight may be required for proper dispersion.

The nature of the composition and its preparation will be better understood from the following examples:

*Example I*

Fifty-nine (59) parts by weight of polybutene, molecular weight about 7,000, was placed in a container and heated in an oil bath to a temperature which permitted the polybutene to flow. To this material was then added one part by weight of lecithin, which was stirred until it had entirely dissolved in the polybutene. Forty (40) parts by weight of flake graphite, 200 mesh, was then added, and the material further mixed until the graphite was uniformly dispersed. The product was then placed in suitable containers, e. g., collapsible ointment tubes, and allowed to cool.

*Example II*

The method of preparation for this composition was the same as that in Example I, except that forty-five parts by weight of polybutene, molecular weight 3,000, five parts by weight of talc, 300 mesh, were substituted for the corresponding components of the previous example.

*Example III*

This composition was prepared in the same manner as Examples I and II except that 88.5 parts by weight of polybutene, molecular weight about 10,000, 0.5 part by weight lecithin, and 11 parts by weight of finely powdered mica were substituted for the corresponding components of the previous examples.

Modifications of the invention other than those described in the foregoing examples will be readily apparent to those skilled in the art and are included within the invention as defined in the appended claims.

The invention described herein may be manufactured and used by or for the Government of the United States of America for governmental purposes without the payment of any royalties thereon or therefor.

Having described my invention what I claim as new and desire to secure by Letters Patent of the United States is:

1. A sealing composition comprising from about 45 to 90 per cent by weight polybutene having a range in molecular weight of from about 3,000 to 10,000, from about 0.5 to 5 per cent by weight lecithin, and from about 10 to 50 per cent by weight of flake graphite having a particle size of between about 200 and 300 mesh, dispersed in the polybutene.

2. A sealing composition comprising about 60 per cent by weight of polybutene having a molecular weight of about 7,000, about 1 per cent by weight of lecithin, and about 40 per cent by weight of flake graphite having a particle size of between about 200 and 300 mesh dispersed in the polybutene.

3. A sealing composition consisting essentially of about 45 parts by weight of a polybutene having a molecular weight of about 3,000, about 1 part by weight of lecithin, and about 5 parts by weight of talc having a particle size of about 300 mesh dispersed therein.

4. A sealing composition consisting essentially of about 88.5% by weight polybutene having a molecular weight of about 10,000, about 0.5% by weight lecithin, and about 11% by weight of mica having a particle size of between about 200 and 300 mesh dispersed therein.

5. A sealing composition comprising from about 45 to 90% by weight of a high viscosity, low volatility polybutene of molecular weight within the range of about 3000 to 10,000, from about 10 to 50% by weight of a finely divided solid lubricant dispersed therein, and from about 0.5 to 5% by weight of a compatible dispersing agent for the solid lubricant.

6. A sealing composition as defined in claim 5, wherein the solid lubricant is selected from the group consisting of finely divided graphite, mica and talc.

7. A sealing composition comprising from about 45 to 90% by weight of a high viscosity, low volatility polybutene of molecular weight within the range of about 3000 to 10,000, from about 10 to 50% by weight of a finely divided solid lubricant dispersed therein, and from about 0.5 to 5% by weight of lecithin.

GEORGE M. HAIN.

REFERENCES CITED

The following references are of record in the file of this patent:

UNITED STATES PATENTS

| Number | Name | Date |
|---|---|---|
| 2,090,708 | Stahl | Aug. 24, 1937 |
| 2,131,342 | Baldeschwieler | Sept. 27, 1938 |
| 2,330,502 | Longman | Sept. 28, 1943 |
| 2,409,336 | Young | Oct. 15, 1946 |
| 2,468,165 | Brister et al. | Apr. 26, 1949 |

FOREIGN PATENTS

| Number | Country | Date |
|---|---|---|
| 525,588 | Great Britain | Aug. 30, 1940 |
| 536,872 | Great Britain | May 30, 1941 |